US012614330B2

(12) United States Patent
Wong et al.

(10) Patent No.: US 12,614,330 B2
(45) Date of Patent: Apr. 28, 2026

(54) RIGGING AN OBJECT

(71) Applicant: Apple Inc., Cupertino, CA (US)

(72) Inventors: Karen N. Wong, Sunnyvale, CA (US);
Eric G. Thivierge, Merchantville, NJ
(US); Gregory Duquesne, San Carlos,
CA (US); Jee Young Park, San Bruno,
CA (US); Jeremy R. Bernstein, San
Francisco, CA (US); **Zachary Z
Becker**, Issaquah, WA (US)

(73) Assignee: Apple Inc., Cupertino, CA (US)

( * ) Notice: Subject to any disclaimer, the term of this
patent is extended or adjusted under 35
U.S.C. 154(b) by 201 days.

(21) Appl. No.: 18/241,600

(22) Filed: Sep. 1, 2023

(65) Prior Publication Data

US 2024/0104818 A1      Mar. 28, 2024

Related U.S. Application Data

(60) Provisional application No. 63/409,253, filed on Sep.
23, 2022.

(51) Int. Cl.
*G06T 13/40*          (2011.01)
*G06T 15/08*          (2011.01)

(52) U.S. Cl.
CPC .............. *G06T 13/40* (2013.01); *G06T 15/08*
(2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2008/0086696 A1* | 4/2008 | Sri Prakash ........... | G06Q 10/00 |
| | | | 715/757 |
| 2013/0230211 A1* | 9/2013 | Tanabiki ................... | G06T 7/75 |
| | | | 382/103 |
| 2020/0388065 A1* | 12/2020 | Miller, IV .............. | G06T 13/40 |

\* cited by examiner

*Primary Examiner* — Nurun Flora
(74) *Attorney, Agent, or Firm* — Fernando & Partners,
LLP

(57) ABSTRACT

A method includes determining a set of one or more visual
appearance values that indicate a visual appearance of an
object that is to be placed in an environment. The method
includes selecting, based on the set of one or more visual
appearance values, a rig that allows the object to be manipu-
lated to exhibit movement in the environment. The method
includes applying the rig to the object by associating joints
of the rig with respective portions of the object. The method
includes animating the object within the environment by
manipulating the joints of the rig associated with the object.

18 Claims, 12 Drawing Sheets

(a) Prompt to associate
root node (b) User associates
root node (c) Remaining
nodes associated
without user input

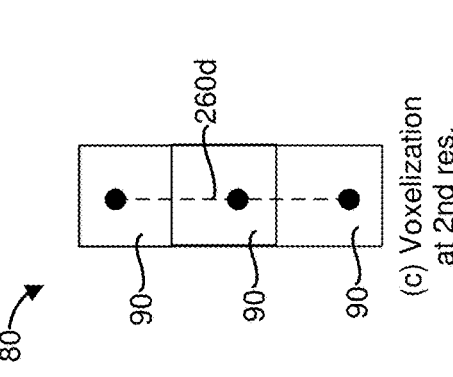
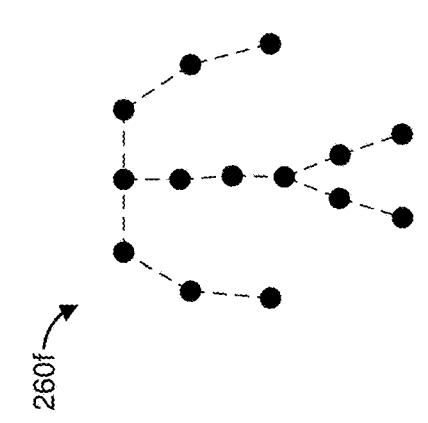
(c) Voxelization at 2nd res.
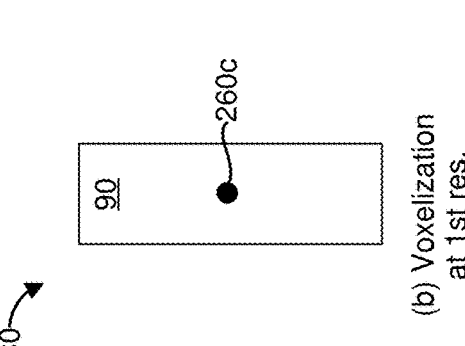
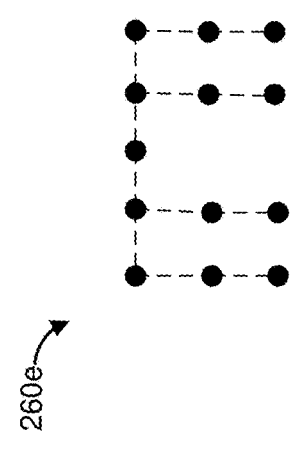
(b) Voxelization at 1st res.
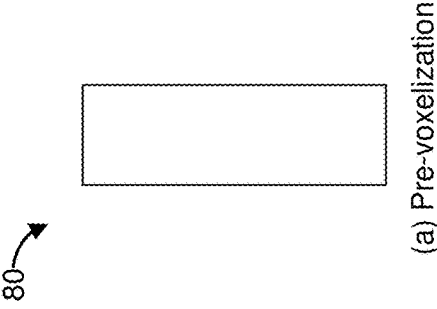
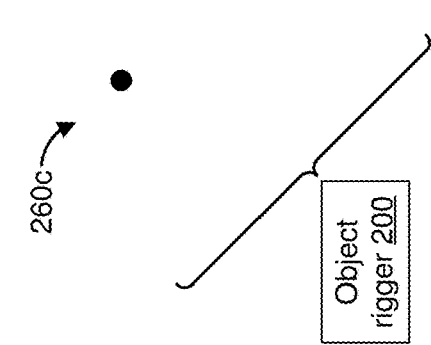
(a) Pre-voxelization
Object rigger 200
Figure 1E

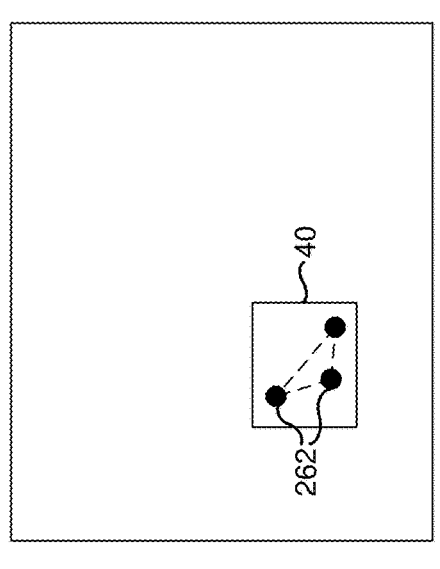
(a) Request to enter edit mode
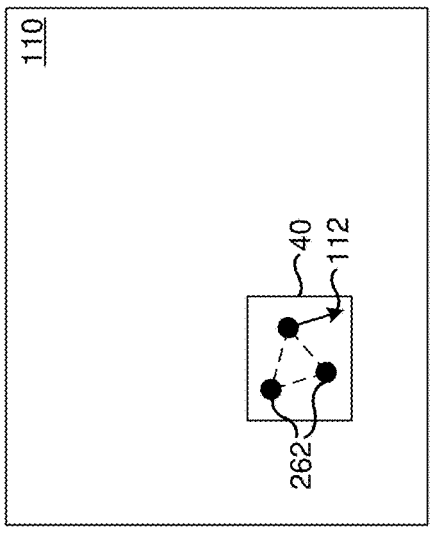
(b) Edit mode
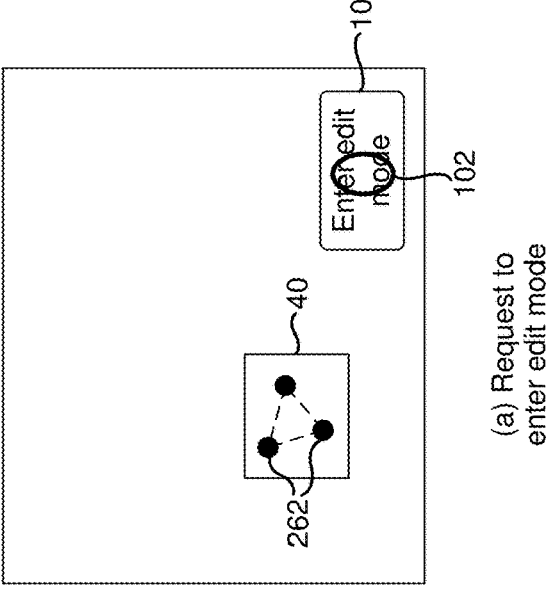
(c) Post edit operation
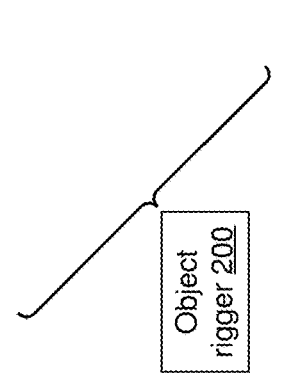
Figure 1F

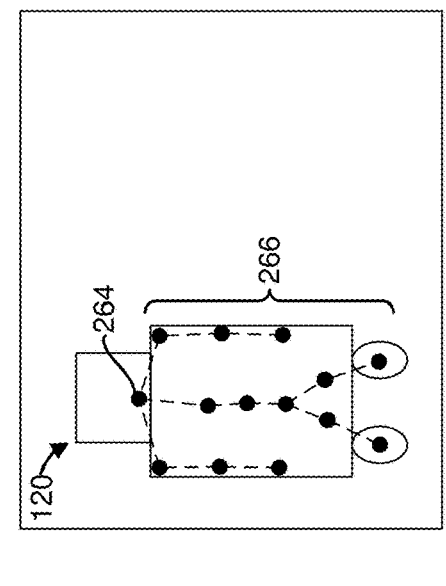
(a) Prompt to associate root node
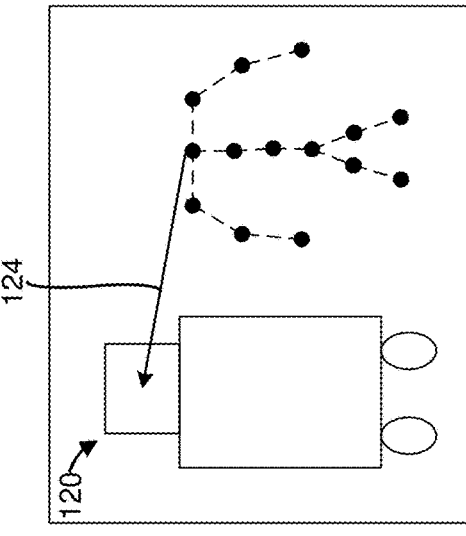
(b) User associates root node
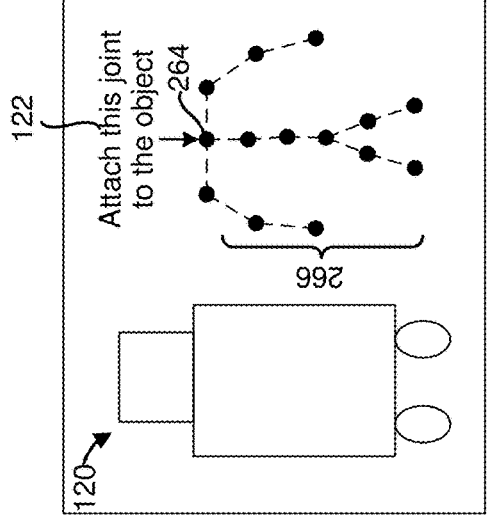
(c) Remaining nodes associated without user input
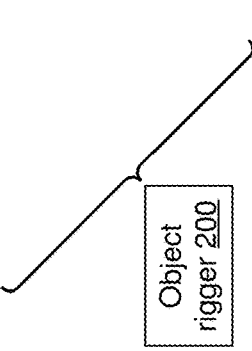
Object rigger 200
Figure 1G

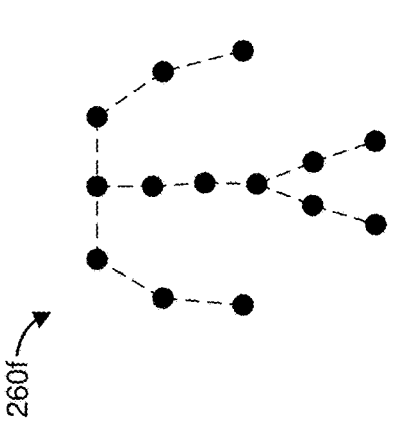
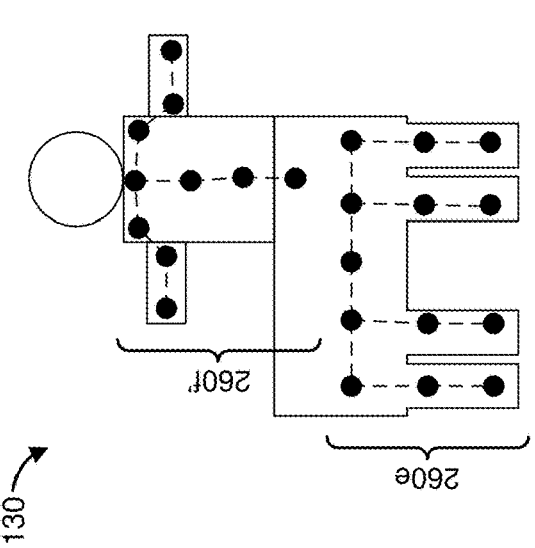
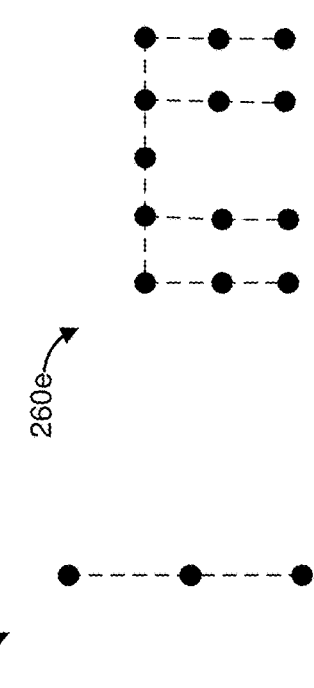
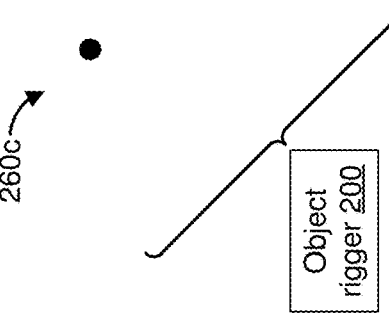
Figure 1H

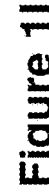
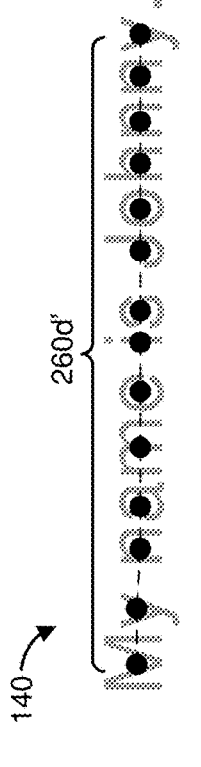
140 —
260d'
(b) Post-rigging
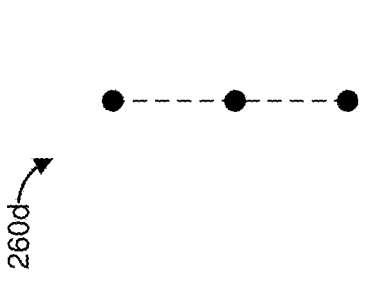
260f —
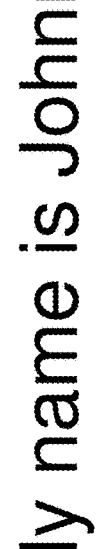
140 —
My name is Johnny.
(a) Pre-rigging
260e —
260d —
260c —
Object rigger 200
Figure 1I

300

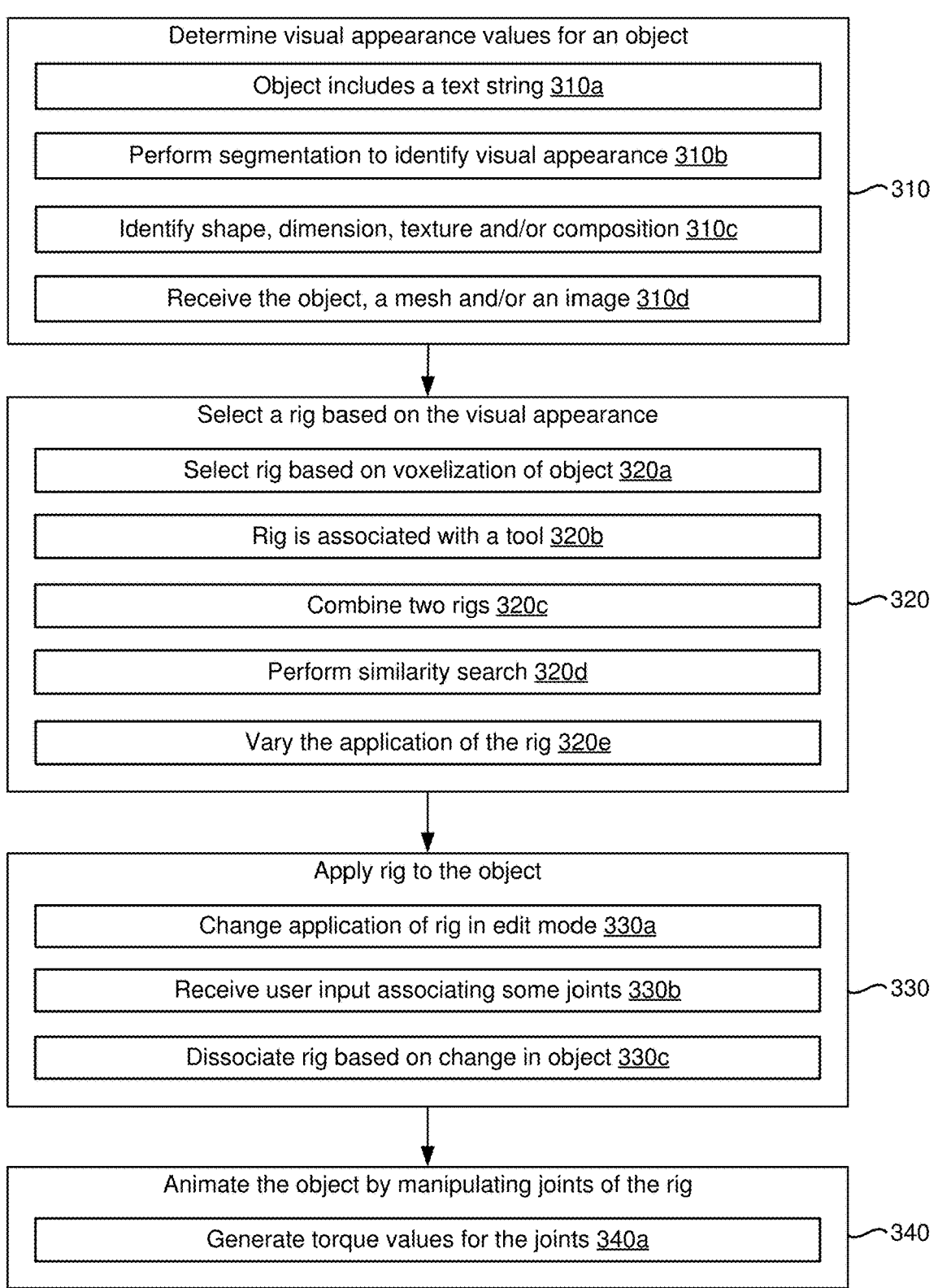

Determine visual appearance values for an object

Object includes a text string 310a

Perform segmentation to identify visual appearance 310b

Identify shape, dimension, texture and/or composition 310c

Receive the object, a mesh and/or an image 310d

310

Select a rig based on the visual appearance

Select rig based on voxelization of object 320a

Rig is associated with a tool 320b

Combine two rigs 320c

Perform similarity search 320d

Vary the application of the rig 320e

320

Apply rig to the object

Change application of rig in edit mode 330a

Receive user input associating some joints 330b

Dissociate rig based on change in object 330c

330

Animate the object by manipulating joints of the rig

Generate torque values for the joints 340a

Network Interface 402

CPU(s) 401

405

I/O device(s) 408

Programming Interface 403

Memory 404

Operating System 406

Data obtainer 210
Instructions 210a
Heuristics & Metadata 210b

Object analyzer 220
Instructions 220a
Heuristics & Metadata 220b

Rig fitter 240
Instructions 240a
Heuristics & Metadata 240b

Rig store 250
Rigs 260

RIGGING AN OBJECT

CROSS-REFERENCE TO RELATED APPLICATION

This application claims the benefit of U.S. Provisional Patent App. No. 63/409,253, filed on Sep. 23, 2022, which is incorporated by reference in its entirety.

TECHNICAL FIELD

The present disclosure generally relates to rigging an object.

BACKGROUND

Some devices include a display that presents visual content. Visual content may include an object that was created by a content creator. In addition to creating the object, the content creator may create a rig for the object. Creating rigs for objects is resource-intensive.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1E is a diagram that illustrates different rigs being associated with an object in accordance with some implementations.

FIG. 1F is a diagram that illustrates a rig being modified in accordance with some implementations.

FIG. 1G is a diagram that illustrates a rig being associated with an object in accordance with some implementations.

FIG. 1H is a diagram that illustrates multiple rigs being associated with an object in accordance with some implementations.

FIG. 1I is a diagram that illustrates a rig being associated with a text string in accordance with some implementations.

FIG. 3 is a flowchart representation of a method of associating a rig with an object in accordance with some implementations.

Figure 1A:
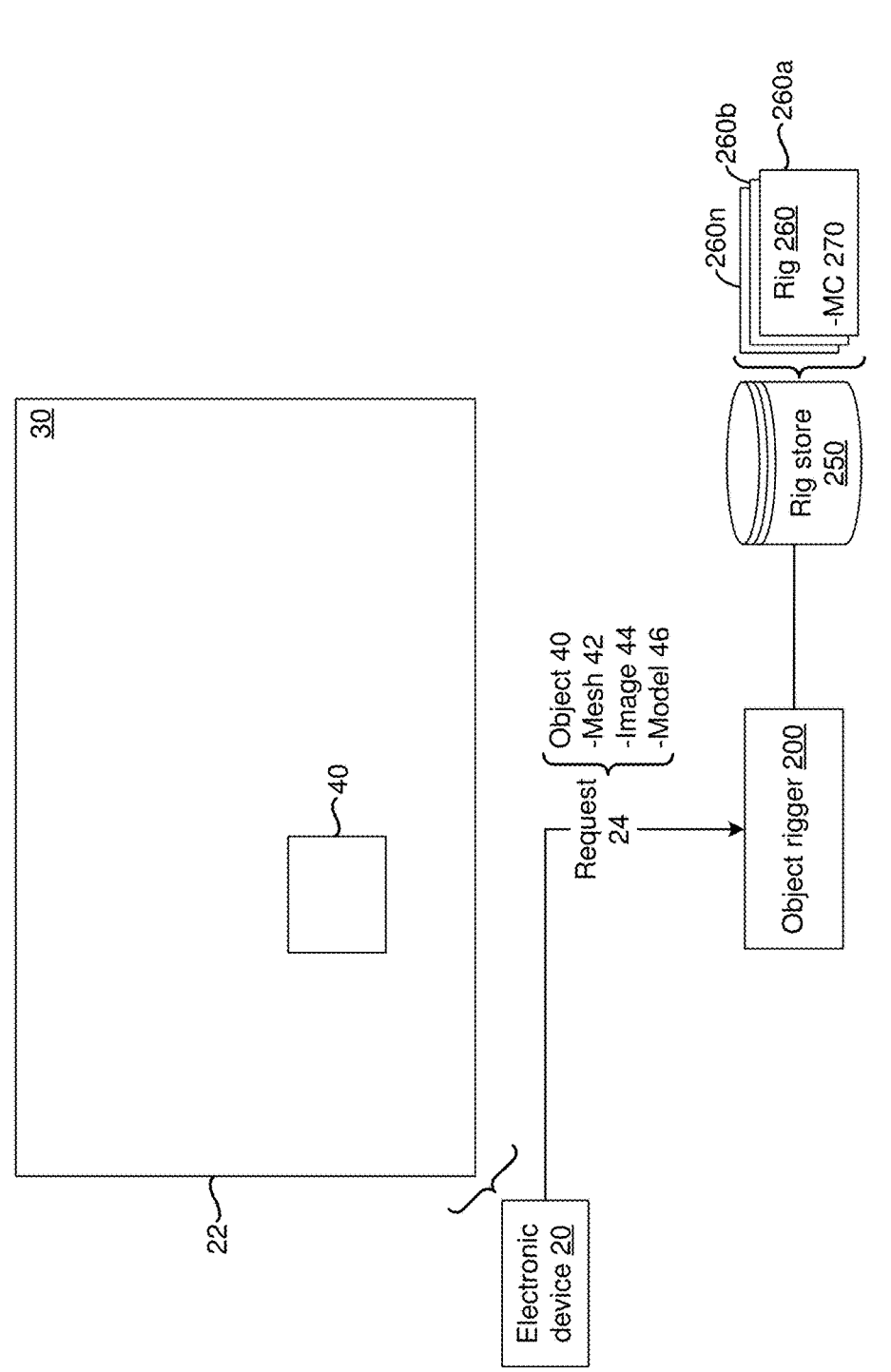
FIGS. 1A-1C are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for rigging an object. In some implementations, the method is performed by a device including one or more processors, a display and a non-transitory memory. In some implementations, the method includes determining a set of one or more visual appearance values that indicate a visual appearance of an object that is to be placed in an environment. In some implementations, the method includes selecting, based on the set of one or more visual appearance values, a rig that allows the object to be manipulated to exhibit movement in the environment. In some implementations, the method includes applying the rig to the object by associating joints of the rig with respective portions of the object. In some implementations, the method includes animating the object within the environment by manipulating the joints of the rig associated with the object.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment.

As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

An object creator can create and apply a rig to an object while the object creator is creating the object. For example, an object creator can create a rig for an object and associate the rig with the object so that the object moves in accordance with joints defined by the rig. Associating a rig with an object may require numerous user inputs. For example, a person (e.g., an object creator or a user of a client device) may be required to select a rig to associate with an object. Subsequently, the user may be required to associate individual joints in the rig with specific portions of the object. Requiring user inputs to select and apply an appropriate rig to an object impedes content generation thereby detracting from a user experience of the device.

The present disclosure provides methods, systems, and/or devices for selecting and applying a rig to an object based on a visual appearance of the object. Applying a rig to an object based on the visual appearance of the object reduces the need to build an object-specific rig for the object thereby conserving resources associated with building an object-specific rig. For example, an application developer can create an object without having to create a rig for the object and a motion controller that controls the rig. In this example, since the application developer does not have to create a rig for the object, the application developer may be able to develop the application sooner thereby allowing users to use the application sooner.

The device can determine a visual appearance of an object by determining a geometry, a shape, dimensions, component composition and/or textures of the object. The device may perform semantic segmentation on the object in order to determine the visual appearance of the object. The device may have access to a library with various rigs, and the device selects one of the rigs that best fits the object based on the visual appearance of the object. For example, the device may perform semantic segmentation on the object to determine whether the object has two legs like a bipedal character or four legs like a quadrupedal character. In this example, the device selects a bipedal rig if the object has two legs and the device selects a quadrupedal rig if the object has four legs. If none of the available rigs match the visual appearance of the object, the device can select a rig that best fits the object based on the visual appearance of the object. The device can generate a new rig by combining two or more existing rigs. For example, the device may combine a top portion of a humanoid rig with a bottom portion of a fish rig to generate a mermaid rig. As another example, the device may combine a top portion of a humanoid rig with a bottom portion of a quadrupedal rig to generate a centaur rig.

After the device selects a rig for an object, the device can prompt a user to associate at least one joint of the rig with a portion of the object. After detecting a user input that associates at least one of the joints with a particular portion of the object, the device can automatically associate a remainder of the joints with other portions of the object. For example, the device may request the user to associate a root joint with a particular portion of the object. In this example, after the user associates a particular portion of the object with the root joint, the device can associate the remaining joints that depend on (e.g., stem from) the root joint without requiring additional user inputs. As an example, the device may request the user to associate a neck joint of a humanoid rig with a particular portion of the object, and after the user associates the neck joint with a particular portion of the object the device can associate shoulder joints, hip joints, knee joints and elbow joints without requiring additional user inputs.

The rig may be associated with a set of one or more tools. For example, the rig may be associated with animation clips that correspond to animations that the rig can undergo. For example, a bipedal rig may be associated with a walking animation clip and a jumping animation clip. As another example, a bird rig may be associated with a flying animation clip. When the rig is associated with the object, the device can manipulate the joints of the rig in accordance with an animation clip in order to provide an appearance that the object is performing an action defined by the animation clip.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and an object rigger 200.

In some implementations, the electronic device 20 includes a handheld computing device that can be held by a user (not shown). For example, in some implementations, the electronic device 20 includes a smartphone, a tablet, a media player, a laptop, or the like. In some implementations, the electronic device 20 includes a wearable computing device that can be worn by the user. For example, in some implementations, the electronic device 20 includes a head-mountable device (HMD) or an electronic watch. In various implementations, the electronic device 20 includes a display 22. In the example of FIG. 1A, the display 22 presents an XR environment 30 that includes an XR object 40 ("object 40", hereinafter for the sake of brevity).

In some implementations, the electronic device 20 obtains the object 40 from a content creator entity that created the object 40. For example, the object 40 may be a part of an application that was developed by an application developer and the application is installed on the electronic device 20. In some implementations, the object 40 represents an image of a physical article. For example, in some implementations, the electronic device 20 includes a camera that captures an image including pixels that correspond to the object 40. In some implementations, the electronic device 20 receives the image from another device (e.g., via a messaging application, a social networking application, etc.).

In various implementations, the content creator entity that created the object 40 does not associate a rig with the object 40 that allows the electronic device 20 to animate the object 40 in order to provide an appearance that the object 40 is performing an action within the XR environment 30. As such, the electronic device 20 invokes the object rigger 200 to associate a rig with the object 40 so that the electronic device 20 can animate the object 40 by manipulating joints of the rig. In the example of FIG. 1A, the object rigger 200 obtains a request 24 from the electronic device 20 to associate a rig with the object 40. In some implementations, the request 24 includes the object 40 or a reference to the object 40 (e.g., an object identifier that the object rigger 200 can use to retrieve the object 40 from an object datastore). In some implementations, the request 24 includes a mesh 42 for the object 40. In some implementations, the request 24 includes an image 44 of the object 40 (e.g., a two-dimensional (2D) image or a three-dimensional (3D) image). In some implementations, the request 24 includes a 3D model 46 of the object 40.

As shown in FIG. 1A, in various implementations, the object rigger 200 has access to a rig store 250 that stores various rigs 260 (e.g., a first rig 260a, a second rig 260b, . . . , and an nth rig 260n). Each of the rigs 260 is defined by an arrangement of interconnected joints that can be manipulated by applying torque values to the joints. In various implementations, the object rigger 200 analyzes the object 40 in order to determine which of the rigs 260 is suitable for the object 40. In some implementations, the object rigger 200 determines a visual appearance of the object 40 and selects one of the rigs 260 that matches the visual appearance of the object 40. For example, the object rigger 200 can select one of the rigs 260 that best fits within a volumetric space enclosed within a boundary of the object 40. In some implementations, each rig 260 is associated with a corresponding motion controller 270 that controls movement of the rig 260. The motion controller 270 generates torque values for joints of the rig 260.

Figure 1B:
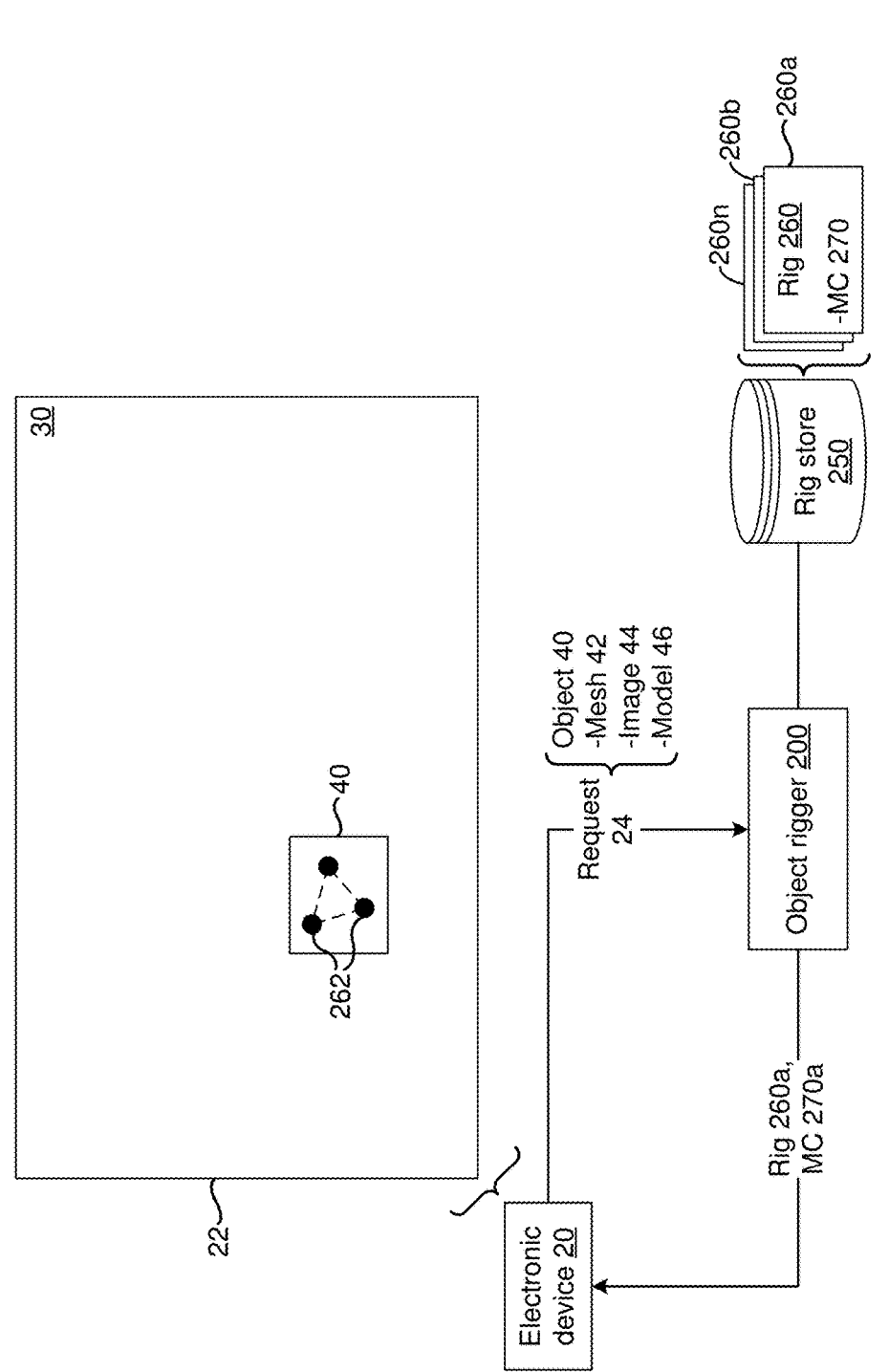

In the example of FIG. 1B, the object rigger 200 selects the first rig 260a for the object 40 based on the visual appearance of the object 40. The object rigger 200 provides the first rig 260a and a corresponding first motion controller 270a to the electronic device 20. The first motion controller 270a generates torque values for joints 262 of the first rig 260a. The electronic device 20 can animate the object 40 by applying the torque values generated by the first motion controller 270a to the joints 262 in order to provide an appearance that the object 40 is performing an action within the XR environment 30.

Figure 1C:
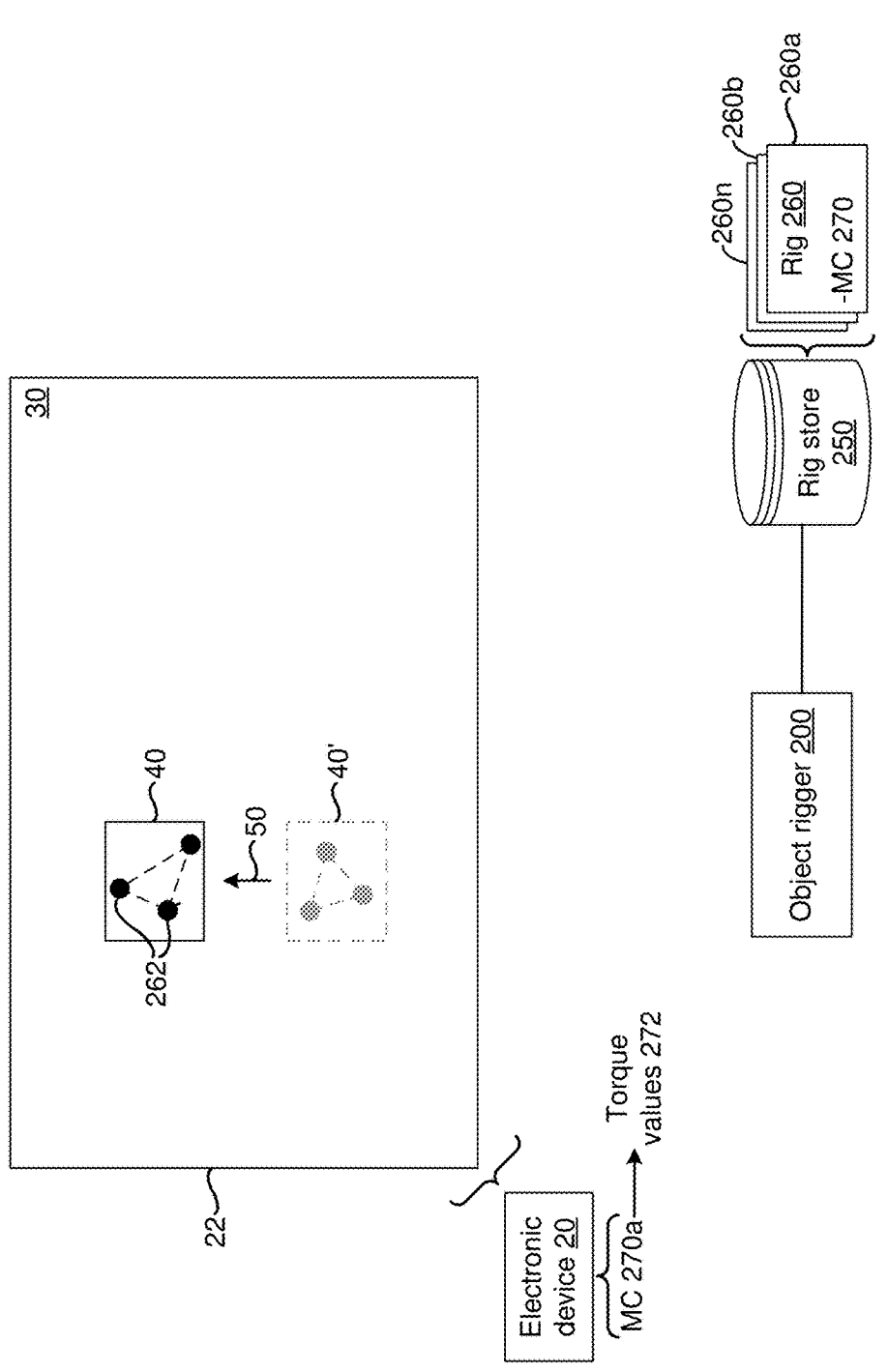

Referring to FIG. 1C, the first motion controller 270a generates torque values 272 for the joints 262. When the torque values 272 are applied to the joints 262, portions of the object 40 that are associated with (e.g., attached to) the joints 262 move thereby resulting in a movement of the object 40. In the example of FIG. 1C, an arrow 50 indicates a jumping motion of the object 40, for example, because applying the torque values 272 to the joints 262 results in a jumping motion of the object 40.

In the example of FIGS. 1A-1C, the object rigger 200 is shown as being separate from the electronic device 20. In some implementations, the object rigger 200 resides at a second electronic device that is different from the electronic device 20 and is proximate to the electronic device 20 (e.g., within a short-range communication threshold). For example, the electronic device 20 may be an HMD and the object rigger 200 may reside at a smartphone, a tablet, a laptop or a desktop that is coupled with the HMD. In some implementations, the object rigger 200 resides at a second electronic device that is different from the electronic device 20 and is distant from the electronic device 20 (e.g., beyond the short-range communication threshold). For example, in some implementations, the electronic device 20 is an HMD, a smartphone, a laptop or a desktop, and the object rigger 200 resides at a server or at a cloud computing platform.

Figure 1D:
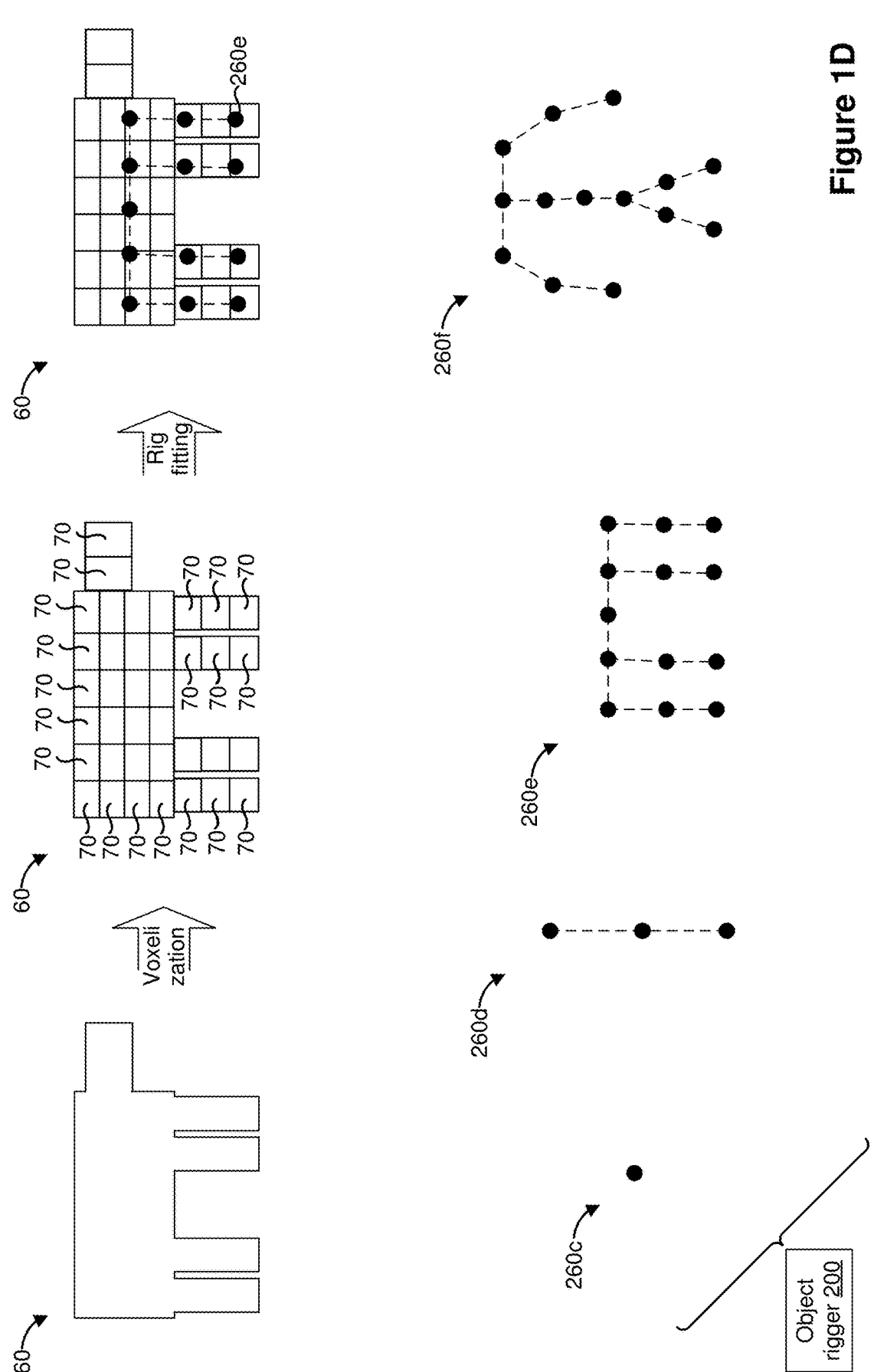
FIG. 1D is a diagram that illustrates a rig being associated with an object in accordance with some implementations.

Referring to FIG. 1D, in some implementations, the object rigger 200 utilizes voxels to determine which of the rigs 260 is suitable for an object. FIG. 1D illustrates an object 60 that is to be associated with a rig. In the example of FIG. 1D, the rigs 260 include a single joint rig 260c, a stack rig 260d, a quadrupedal rig 260e and a bipedal rig 260f (e.g., a humanoid rig). In some implementations, the object rigger 200 performs a voxelization operation on the object 60 by identifying a boundary of the object 60 and partitioning a space enclosed by the boundary into voxels 70. After populating the object 60 with the voxels 70, the object rigger 200 selects one of the rigs 260 based on a match between an arrangement of the voxels 70 and an arrangement of joints of the rigs 260. In the example of FIG. 1D, the arrangement of the voxels 70 most closely matches the arrangement of joints in the quadrupedal rig 260e. Hence, the object rigger 200 selects the quadrupedal rig 260e for the object 60. In some implementations, the object rigger 200 determines the arrangement of the voxels 70 by averaging positions of the voxels 70. In some implementations, determining the arrangement of the voxels 70 includes determining respective alignments of subsets of the voxels 70. For example, the object rigger 200 may determine that a subset of the voxels 70 are aligned horizontally thereby matching horizontally aligned joints of the quadrupedal rig 260e that represent spinal joints (e.g., a backbone).

In some implementations, the object rigger 200 determines whether the arrangement of the voxels 70 matches the arrangement of the joints of a rig 260 based on whether all the joints of the rig 260 fit within the space enclosed by the boundary of the object 60 and a distribution of the joints within the space enclosed by the boundary of the object 60. In the example of FIG. 1D, the single joint rig 260c and the stack rig 260d fit within the boundary of the object 60. However, the joints of the single joint rig 260c and the stack rig 260d would not be as distributed as the joints of the quadrupedal rig 260e. Moreover, all the joints of the bipedal rig 260f likely do not fit within the boundary of the object 60. More generally, in various implementations, the object rigger 200 selects a particular rig 260 for an object in response to joints (e.g., all joints) of that particular rig 260 satisfying a distribution criterion (e.g., all joints being within a boundary of the object and being distributed evenly throughout the object).

Referring to FIG. 1E, in some implementations, the object rigger 200 can perform the voxelization operation at different resolutions. Performing the voxelization operation at a relatively lower resolution results in fewer voxels and performing the voxelization operation at a relatively higher resolution results in a greater number of voxels. Section (a) of FIG. 1E illustrates an object 80. As shown in section (b) of FIG. 1E, the object rigger 200 can perform the voxelization operation at a first resolution that results in a single voxel 90 within the object 80. The single voxel 90 matches the single joint rig 260c. As such, when the object 80 undergoes the voxelization operation at the first resolution, the object rigger 200 associates the single joint rig 260c with the object 80. Alternatively, as shown in section (c) of FIG. 1E, the object rigger 200 can perform the voxelization operation at a second resolution that is greater than the first resolution. As can be seen in section (c) of FIG. 1E, performing the voxelization operation at the second resolution results in three voxels 90 within the object 80. Since the three voxels 90 form a line, the arrangement of the three voxels 90 matches the arrangement of the joints of the stack rig 260d. As such, when the object 80 undergoes the voxelization operation at the second resolution, the object rigger 200 associates the stack rig 260d with the object 80.

FIG. 1F illustrates an edit mode for modifying the association of joints of a rig with portions of an object. As illustrated in section (a) of FIG. 1F, in some implementations, the object rigger 200 displays an edit mode affordance 100 that, when selected, triggers presentation of an edit mode for modifying the association of the rig with the object 40. When the electronic device 20 detects a user input 102 directed to the edit mode affordance 100, the object rigger 200 presents an edit mode 110 that allows a user (e.g., an object creator) to move the joints 262 so that the joints 262 can be associated with different portions of the object 40. As illustrated in section (b) of FIG. 1F, while presenting the edit mode 110, the object rigger 200 detects a user input 112 that corresponds to a request to move one of the joints 262 to a different portion of the object 40. As can be seen in section (c) of FIG. 1F, the object rigger 200 moves one of the joints 262 in accordance with the user input 112. In some implementations, the edit mode 110 is available to content creators while they are creating the object 40. For example, the edit mode 110 may be available to an application developer that is developing an application with the object 40. As such, in some implementations, the edit mode 110 is referred to as a developer mode. Additionally or alternatively, in some implementations, the edit mode 110 is available to an end user. In some implementations, the electronic device 20 (shown in FIGS. 1A-1C) displays the edit mode affordance 100 and the edit mode 110.

FIG. 1G illustrates a rig setup mode in which the object rigger 200 associates the bipedal rig 260f with an object 120 (e.g., a virtual robot object) based on a user input. The object rigger 200 automatically selects the bipedal rig 260f based on an appearance of the object 120. In the example of FIG. 1G, a neck joint of the bipedal rig 260f operates as a root node of a tree data structure and a remainder of the joints of the bipedal rig 260f serve as dependent nodes that depend from the root node. As illustrated in section (a) of FIG. 1G, the object rigger 200 displays a prompt 122 requesting a user (e.g., an object creator such as a developer, or a user of the electronic device 20 shown in FIGS. 1A-1C) to associate a neck joint 264 with a portion of the object 120. As shown in section (b) of FIG. 1G, the object rigger 200 detects a user input 124 that corresponds to attaching the neck joint 264 of the bipedal rig 260f to a top portion of the object 120. As shown in section (c) of FIG. 1G, the object rigger 200 automatically associates a remainder of the joints 266 of the bipedal rig 260f based on the association of the neck joint 264 with the top portion of the object 120. In some implementations, the object rigger 200 determines dependency relationships between portions of the object 120, and the object rigger 200 associates the remainder of the joints 266 of the bipedal rig 260f based on the dependency relationships between different portions of the object 120. In some implementations, movement of some of the joints is restricted based on an appearance of the object. In the example of FIG. 1G, movement of shoulder joints, elbow joints and wrist joints of the bipedal rig 260f may be restricted, for example, because the object 120 does not appear to have moveable arms.

FIG. 1H illustrates an object 130 (e.g., a virtual centaur object) that the object rigger 200 associates with portions of multiple rigs. In some implementations, the object rigger 200 determines visual appearance values for respective portions of the object 130. For example, the object rigger 200 generates a first visual appearance value for a top half of the object 130 and a second visual appearance value for a bottom half of the object 130. In some implementations, the object rigger 200 associates portions of different rigs with different portions of the object 130 based on the visual appearance values corresponding with the different portions of the object 130. In the example of FIG. 1H, the object rigger 200 associates a top half of the bipedal rig 260f with the top half of the object 130 based on the first visual appearance value. The object rigger 200 associates an entirety of the quadrupedal rig 260e with the bottom half of the object 130 based on the second visual appearance value. Since the top half of the object 130 is rigged with the top half of the bipedal rig 260f, the top half of the object 130 can be animated to move in a manner similar to a top portion of a human being. Since the bottom half of the object 130 is rigged with the quadrupedal rig 260e, the bottom half of the object 130 can be animated to move in a manner similar to a quadrupedal being such as a horse. The top half of the object 130 and the bottom half of the object 130 can collectively be animated to move in a manner similar to a fictional centaur.

FIG. 1I illustrates the object rigger 200 rigging a text string 140. The text string 140 has a series of characters. The object rigger 200 selects the stack rig 260d for the text string 140. The object rigger 200 associates the text string 140 with a modified stack rig 260d' that includes a series of connected stack rigs 260d. In the example of FIG. 1I, each character in the text string 140 is associated with a respective joint in the modified stack rig 260d'. Associating each character of the text string 140 with a joint allows each character in the text string 140 to move independently. Alternatively, in some implementations, some of the characters in the text string 140 may be associated with joints while a remainder of the characters in the text string 140 may not be associated with joints thereby restricting the movement of the text string 140. For example, each word in the text string 140 may be associated with a joint (e.g., the first letter of each word may be associated with a joint). In some examples, phrases that correspond to known entities (e.g., places, persons or things) may be associated with joints while other phrases may not be associated with joints thereby allowing phrases that represent entities to move (e.g., wiggle or be animated in some other manner) while not allowing phrases that do not represent entities to move.

Figure 2:
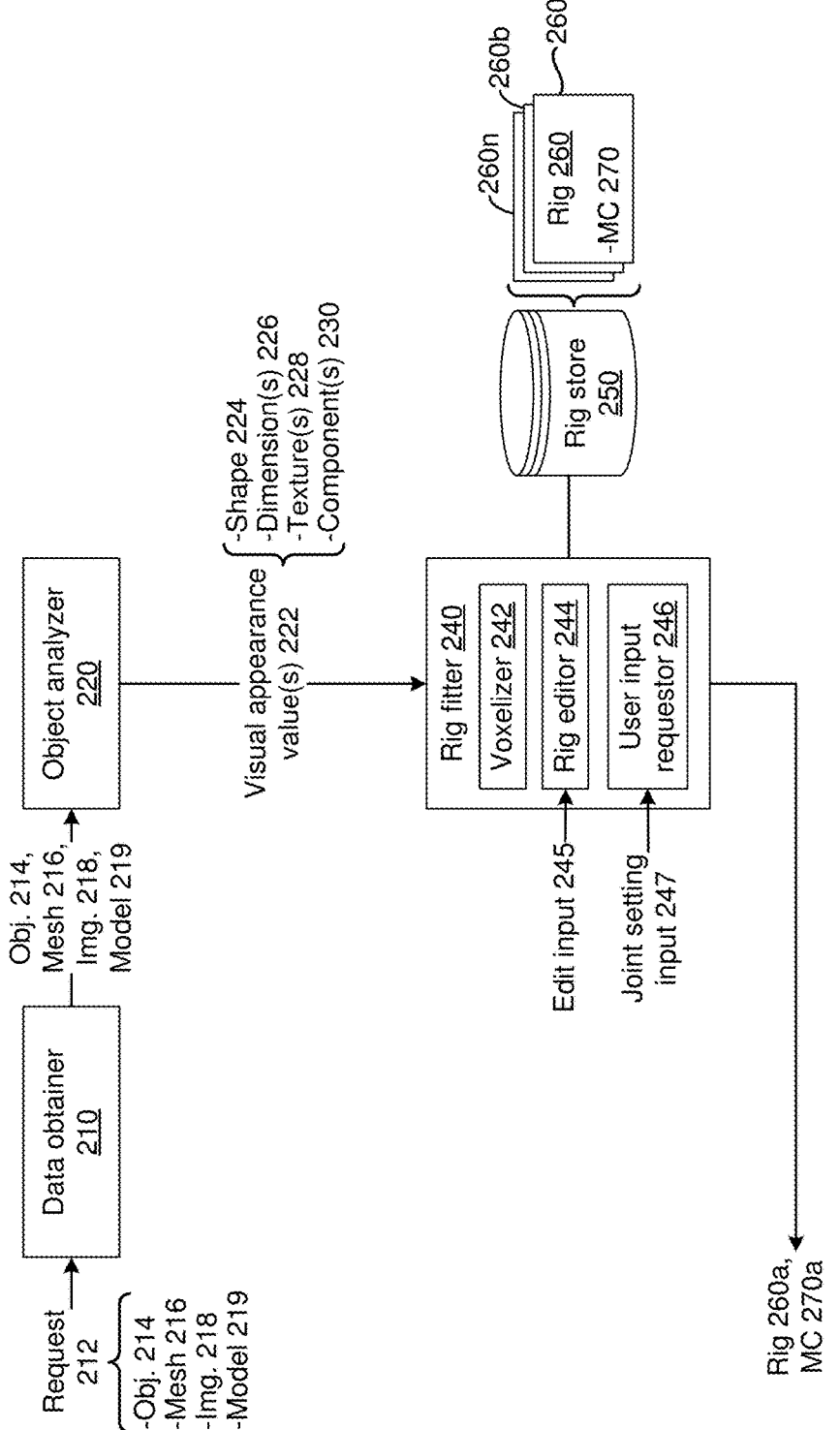
FIG. 2 is a diagram of an object rigger in accordance with some implementations.

FIG. 2 is a block diagram of the object rigger 200 in accordance with some implementations. In various implementations, the object rigger 200 includes a data obtainer 210, an object analyzer 220 and a rig fitter 240. In various implementations, the data obtainer 210 obtains a request 212 for a rig for an object 214. For example, the data obtainer 210 receives the request 24 to rig the object 40 shown in FIG. 1A. In some implementations, the request 212 includes the object 214, an ID that identifies the object 214, a mesh 216 for the object 214, an image 218 of the object 214 and/or a model 219 of the object 214 (e.g., the mesh 42, the image 44 and/or the model 46 shown in FIG. 1A).

In some implementations, the data obtainer 210 receives the request 212 from an entity that created the object 214 (e.g., from an application developer developing an application that includes the object 214). In some implementations, the data obtainer 210 receives the request 212 after the object 214 has been completed. Alternatively, in some implementations, the data obtainer 210 receives the request while a content creator is creating the object 214. For example, while the content creator is creating the object 214, the content creator may want to see what type of a rig can be associated with the object 214.

In some implementations, the data obtainer 210 receives the request 212 via an application programming interface (API). In some implementations, the object rigger 200 provides object rigging as a subscription-based service. In such implementations, the data obtainer 210 may authenticate the request 212 to determine whether the request 212 is associated with a paid subscription to the object rigging service. The request 212 may further include authentication information (e.g., a username and/or a password), and the data obtainer 210 can utilize the authentication information to determine whether the authentication information is associated with a valid subscription to the object rigging service. If the request 212 is associated with a paid subscription to the object rigging service, the data obtainer 210 forwards the request 212 to the object analyzer 220. However, if the request 212 is not associated with a paid subscription to the object rigging service, the data obtainer 210 does not forward the request 212 to the object analyzer 220. If the request 212 is not associated with a paid subscription to the object rigging service, the data obtainer 210 can provide an option to enroll in the object rigging service.

In various implementations, the object analyzer 220 determines a set of one or more visual appearance values 222 ("visual appearance values 222", hereinafter for the sake of brevity) that characterize an appearance of the object 214. The object analyzer 220 can determine the visual appearance values 222 by analyzing the object 214, the mesh 216, the image 218 and/or the model 219. In some implementations, the visual appearance values 222 indicate a shape 224 of the object 214. In some implementations, the visual appearance values 222 indicate a set of one or more dimensions of the object 214. In some implementations, the visual appearance values 222 indicate a set of one or more textures of the object 214. In some implementations, the visual appearance values 222 indicate one or more components 230 of the object 214.

In some implementations, the visual appearance values 222 correspond to respective portions of the object 214. For example, the visual appearance values 222 may include a first visual appearance value that characterizes a first visual appearance (e.g., a first shape, a first dimension, a first texture and/or a first set of components) of a first portion of the object 214, a second visual appearance value that characterizes a second visual appearance (e.g., a second shape, a second dimension, a second texture and/or a second set of components) of a second portion of the object 214, . . . , and an nth visual appearance value that characterizes an nth visual appearance (e.g., an nth shape, an nth dimension, an nth texture and/or an nth set of components) of an nth portion of the object 214.

In some implementations, the object analyzer 220 determines the visual appearance values 222 by performing semantic segmentation on the object 214. In some implementations, performing semantic segmentation includes generating semantic values (e.g., semantic labels) for respective portions of the object 214. In some implementations, the semantic values indicate potential functions of the respective portions of the object 214. In some implementations, the semantic values indicate a possible degree of movement for the respective portions of the object 214. In some implementations, the semantic values indicate types of movements that the respective portions of the object 214 are expected to exhibit.

In some implementations, the object analyzer 220 utilizes a machine-learned classifier that classifies the object 214 into one or more known object types. In such implementations, the visual appearance values 222 refer to the one or more known object types that the machine-learned classifier has classified the object 214 into. In some implementations, the object analyzer 220 utilizes a neural network system (e.g., a set of one or more neural networks) to generate the visual appearance values 222. The neural network system accepts the object 214, the mesh 216, the image 218 and/or the model 219 as inputs, and outputs the visual appearance values 222.

In various implementations, the rig fitter 240 selects a subset of the rigs 260 based on the visual appearance values 222. In some implementations, the rig fitter 240 selects a particular one of the rigs 260 for the object 214 based on the visual appearance values 222. In the example of FIG. 2, the rig fitter 240 selects the first rig 260a for the object 214 based on the visual appearance values 222. In some implementations, the rig fitter 240 selects the first rig 260a in response to a visual appearance of the first rig 260a matching a visual appearance defined by the visual appearance values 222. For example, in some implementations, the rig fitter 240 selects the first rig 260a in response to a shape of the first rig 260a being within a similarity threshold of the shape 224 of the object 214. In some implementations, the rig fitter 240 selects the first rig 260a in response to dimensions of the first rig 260a being within an acceptability threshold of the dimensions 226 of the object 214. In some implementations, the rig fitter 240 selects the first rig 260a in response to the first motion controller 270a being able to generate a sufficient number of torque values for the components 230 of the object 214.

In some implementations, the rig fitter 240 selects more than one rig from the rig store 250. For example, the rig fitter 240 can select a first one of the rigs 260 for a first portion of the object 214 and a second one of the rigs 260 for a second portion of the object 214. As an example, referring to FIG. 1H, the rig fitter 240 may select the quadrupedal rig 260e for the bottom portion of the object 130 and the top portion of the bipedal rig 260f for the top portion of the object 130.

In some implementations, the rig fitter 240 includes a voxelizer 242 that voxelizes the object 214 by partitioning a space enclosed by the object 214 into voxels. For example, as shown in FIG. 1D, the voxelizer 242 can perform the voxelization operation on the object 60 in order to generate the voxels 70. The rig fitter 240 can select one of the rigs 260 based on an arrangement of the voxels (e.g., based on a layout of the voxels). For example, the rig fitter 240 may select the first rig 260a in response to the arrangement of voxels within the object 214 being within a threshold of an arrangement of joints in the first rig 260a. As an example, if the voxels in the object 214 are arranged linearly to form a line, the rig fitter 240 may select the stack rig 260d shown in FIG. 1D. As another example, if the voxels in the object 214 are arranged into four lines that extend approximately perpendicularly from a fifth line, the rig fitter 240 may select the quadrupedal rig 260e shown in FIG. 1E.

In some implementations, the rig fitter 240 associates joints of the selected rig 260 with respective portions of the object 214. For example, the rig fitter 240 associates the joints of the first rig 260a with respective portions of the object 214. In some implementations, the rig fitter 240 automatically associates the joints with the object 214 without requiring a user input that manually associates a joint with the object 214.

In some implementations, the rig fitter 240 includes a rig editor 244 that allows a user (e.g., an object creation entity such as an application developer) to edit how the first rig 260a is associated with the object 214. The rig editor 244 can display a rig editing user interface that accepts an edit input 245 corresponding to a request to move one of the joints from one portion of the object 214 to another portion of the object 214. For example, the rig editor 244 can display the edit mode 110 shown in FIG. 1F. The rig editing user interface can superimpose the joints of the first rig 260a with the object 214 so that a person editing the first rig 260a can see the association between the joints and the portions of the object 214.

In some implementations, the rig fitter 240 includes a user input requestor 246 that requests a user input that associates at least one of the joints of the selected rig 260 (e.g., the first rig 260a) with the object 214. For example, the user input requestor 246 displays the prompt 122 shown in FIG. 1G. The user input requestor 246 receives a joint setting input 247 that associates at least one joint in the first rig 260a with a particular portion of the object 214. For example, the user input requestor 246 receives the user input 124 shown in section (b) of FIG. 1G. In some implementations, the rig fitter 240 automatically associates a remainder of the joints of the first rig 260a with the object 214 based on the association of one of the joints indicated by the joint setting input 247.

FIG. 3 is a flowchart representation of a method 300 for rigging an object. In various implementations, the method 300 is performed by the object rigger 200 shown in FIGS. 1A-2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining a set of one or more visual appearance values that indicate a visual appearance of an object that is to be placed in an environment. For example, as shown in FIG. 2, the object analyzer 220 determines the visual appearance values 222 for the object 214. In some implementations, determining the visual appearance values includes determining a shape, dimensions, textures and/or components of the object (e.g., the shape 224, the dimensions 226, the textures 228 and/or the components 230 shown in FIG. 2).

In some implementations, the method 300 includes receiving a request to associate the object with a rig (e.g., the request 24 shown in FIG. 1A). In some implementations, the request includes the object, a reference to the object, an image of the object and/or a model (e.g., a 3D model) of the object. In some implementations, the object includes a 2D object. For example, in some implementations, the object is a portion of an image captured by the device. In some implementations, the object includes a 3D object. For example, in some implementations, the object includes a 3D model. As represented by block 310a, in some implementations, the object includes a text string (e.g., the text string 140 shown in FIG. 1I).

As represented by block 310b, in some implementations, determining the set of one or more visual appearance values includes performing a combination of instance segmentation and semantic segmentation on the object. For example, as described in relation to FIG. 2, in some implementations, the object analyzer 220 performs semantic segmentation on the object 214 in order to generate semantic values that describe different portions of the object 214.

As represented by block 310c, in some implementations, the set of one or more visual appearance values indicates a shape of the object. For example, as shown in FIG. 2, in some implementations, the visual appearance values 222 indicate the shape 224 of the object. In some implementations, the set of one or more visual appearance values indicates dimensions of the object. For example, as shown in FIG. 2, in some implementations, the visual appearance values 222 indicate the dimensions 226 of the object 214. In some implementations, the set of one or more visual appearance values indicates textures of the object. For example, as shown in FIG. 2, in some implementations, the visual appearance values 222 indicate the textures 228 of the object 214. In some implementations, the set of one or more visual appearance values indicates components that the object is composed of. For example, as shown in FIG. 2, in some implementations, the visual appearance values 222 indicate the components 230 of the object 214.

As represented by block 310d, in some implementations, the method 300 includes obtaining the object that is to be placed in the environment. For example, as shown in FIG. 1A, the object rigger 200 receives the request 24 that includes the object 40. In some implementations, the device receives the object or a reference to the object (e.g., an ID of the object) via an API request. In some implementations, obtaining the object includes obtaining a mesh of the object. For example, as shown in FIG. 1A, the object rigger 200 may receive the mesh 42 as part of the request 24. In some implementations, obtaining the object includes obtaining an image that includes a two-dimensional representation of the object. For example, as shown in FIG. 1A, the object rigger 200 may receive the image 44 as part of the request 24. In some implementations, obtaining the object includes obtaining a model of the object. For example, as shown in FIG. 1A, the object rigger 200 may receive the model as part of the request 24.

As represented by block 320, in various implementations, the method 300 includes selecting, based on the set of one or more visual appearance values, a rig that allows the object to be manipulated to exhibit movement in the environment. For example, referring to FIG. 2, the first rig 260a allows the object 214 to be animated in order to provide an appearance that the object 214 is performing an action. In some implementations, the method 300 includes selecting the rig from a plurality of rigs. For example, as shown in FIG. 2, the object rigger 200 selects the first rig 260a from the set of rigs 260 based on the visual appearance values 222.

As represented by block 320a, in some implementations, selecting the rig includes populating a volumetric space of the object with voxels, and selecting the rig from a plurality of rigs based on an arrangement of the voxels within the volumetric space of the object. In some implementations, selecting the rig includes selecting the rig in response to the arrangement of the voxels matching an arrangement of the joints in the rig. For example, as shown in FIG. 1D, the object rigger 200 partitions the object 60 into the voxels 70 and selects the quadrupedal rig 260e based on the arrangement of the voxels 70 matching the arrangement of the joints of the quadrupedal rig 260e.

In some implementations, a number of voxels that occupy the volumetric space of the object is based on a resolution of the voxels. In some implementations, selecting the rig includes selecting a first one of the plurality of rigs in response to the resolution of the voxels being a first resolution that results in a first number of voxels that is greater than a threshold number, and selecting a second one of the plurality of rigs in response to the resolution of the voxels being a second resolution that results in a second number of voxels that is less than the threshold number. For example, as shown in FIG. 1E, the object rigger 200 selects the single joint rig 260c when the object 80 is voxelized at the first resolution and the object rigger 200 selects the stack rig 260d when the object 80 is voxelized at the second resolution that is greater than the first resolution.

As represented by block 320b, in some implementations, the rig is associated with a tool that allows the object to be manipulated in order to provide an appearance that the object is performing an action. In some implementations, the tool includes an animation clip for an animation that corresponds to the action. For example, if the action is to fly, the tool includes a flying animation clip. In some implementations, the action includes moving along a path and the tool includes a motion path clip that allows the object to move along the path. As an example, referring to FIG. 2, each of the rigs 260 may be associated with a set of animation clips and/or a set of motion path clips that the rig 260 supports.

As represented by block 320c, in some implementations, selecting the rig includes concurrently selecting a first rig for a first portion of the object based on a first one of the set of one or more visual appearance values indicating that the first portion of the object has a first visual appearance that satisfies a first accommodation criterion associated with the first rig, and selecting a second rig for a second portion of the object based on a second one of the set of one or more visual appearance values indicating that the second portion of the object has a second visual appearance that satisfies a second accommodation criterion associated with the second rig. In some implementations, the first accommodation criterion is satisfied when a first set of joints of the first rig can fit within a first volumetric space defined by the first portion of the object and the second accommodation criterion is satisfied when a second set of joints of the second rig can fit within a second volumetric space defined by the second portion of the object. For example, as shown in FIG. 1H, the object rigger 200 selects the quadrupedal rig 260e for the bottom half of the object 130 because all the joints of the quadrupedal rig 260e fit within the bottom portion of the object 130, and the object rigger 200 selects the top half of the bipedal rig 260f for the top half of the object 130 because the joints in the top half of the bipedal rig 260f fit within the top portion of the object 130 thereby creating a moveable virtual centaur object.

In some implementations, selecting the rig includes synthesizing the rig by combining a first rig that matches a first portion of the object and a second rig that matches a second portion of the object. For example, combining the quadrupedal rig 260e and the bipedal rig 260f as shown in FIG. 1H. As another example, the object rigger 200 can combine a bottom portion of a horse rig with a wings portion of a bird rig to create a rig for a virtual Pegasus object.

As represented by block 320d, in some implementations, the rig is associated with a second object with a second set of one or more visual appearance values, and selecting the rig includes selecting the rig in response to the set of one or more visual appearance values being within a threshold of the second set of one or more visual appearance values. For example, the object rigger 200 can determine that an unrigged object is within a similarity threshold of a rigged object, and apply the rig of the rigged object to the unrigged object thereby rigging the unrigged object.

As represented by block 320e, in some implementations, applying the rig includes restricting movement of at least some of the joints based on the set of one or more visual appearance values. As an example, if the visual appearance values indicate that legs of the object are joined, then leg joints of the bipedal rig are coupled so that the legs move together like that of a kangaroo instead of moving separately like a human's legs. In some implementations, applying the rig includes applying symmetric portions of the rig to symmetric portions of the object in different manners. For example, allowing a right portion of the object to move more freely than a left portion of the object. In some implementations, applying the rig to the object includes assigning respective weights to the joints based on the set of one or more visual appearance values. In some implementations, the respective weights affect movement of the joints. For example, a joint with a greater weight may have less freedom of movement than a joint with a smaller weight.

As represented by block 330, in various implementations, the method 300 includes applying the rig to the object by associating joints of the rig with respective portions of the object. For example, as shown in FIG. 1B, the object rigger 200 applies the first rig 260a to the object 40 by associating the joints 262 of the first rig 260a with respective portions of the object 40. In some implementations, the object rigger 200 determines a mapping of the joints to the portions of the object based on the visual appearance values. The mapping indicates, for each joint, a portion of the rig with which the joint is to be associated with. In some implementations, each joint is associated with a descriptive label that indicates a function of the joint (e.g., shoulder joint, knee joint, elbow joint, hip joint, etc.) and some portions of the object are associated with semantic labels that identify a function of the portion (e.g., shoulder, knee, elbow, hip, etc.). In such implementations, the object rigger 200 associates the joints with the appropriate portions by matching the descriptive labels of the joints with the semantic labels of the portions of the object. For example, the object rigger 200 may associate the shoulder joint with a portion of the object that is semantically labeled as the shoulder.

As represented by block 330a, in some implementations, the method 300 includes obtaining a request to display an edit mode for changing the association of the joints with the portions of the object, displaying the joints of the rig in association with the respective portions of the object such that a first one of the joints is associated with a first one of the portions of the object, detecting a user input that corresponds to moving the first one of the joints of the rig from the first one of the portions to a second one of the portions of the object, and associating the first one of the joints with the second one of the portions of the object. For example, as shown in FIG. 1F, the object rigger 200 detects the user input 102 directed to the edit mode affordance 100, the object rigger 200 displays the edit mode 110, detects the user input 112 in the edit mode 110, and moves one of the joints 262 in response to detecting the user input 112.

As represented by block 330*b*, in some implementations, the joints collectively form a tree data structure, and applying the rig to the object includes displaying the rig and the joints of the rig, obtaining a user input that associates a first one of the joints with a first one of the portions of the object, and associating the remainder of the joints with a remainder of the portions of the object based on the association of the first one of the joints with the first one of the portions of the object. The first one of the joints represents a root node in the tree data structure and a remainder of the joints represent child nodes that depend on (e.g., stem from) the root node. In some implementations, obtaining the user input includes displaying a prompt to associate the first one of the joints with one of the portions of the object. For example, as shown in FIG. 1G, the object rigger 200 displays the prompt 122 requesting the user to associate the neck joint 264 with a portion of the object 120, and the object rigger 200 automatically associates the remainder of the joints 266 with respective portions of the object 120 based on the association of the neck joint 264 with the portion of the object 120 that the user input 124 specified.

As represented by block 330*c*, in some implementations, the method 300 includes detecting a change in the visual appearance of the object, disassociating the rig from the object in response to detecting the change in the visual appearance of the object, and applying another rig to the object based on a new visual appearance of the object. For example, if an entity that created the object makes a change to the object to alter the way the object looks, the object rigger 200 can select a different rig that may be more suitable for the changed object.

As represented by block 340, in various implementations, the method 300 includes animating the object within the environment by manipulating the joints of the rig associated with the object. For example, as shown in FIG. 1C, the electronic device 20 displays an animation of the object 40. As represented by block 340*a*, in some implementations, the method 300 includes generating, by a motion controller, torque values for the joints of the rig based on an upcoming action in an animation pipeline, and moving the joints in accordance with the torque values. For example, as shown in FIG. 1C, the first motion controller 270*a* generates the torque values 272 for the joints 262 of the first rig 260*a* after the first rig 260*a* is applied to the object 40.

Figure 4:
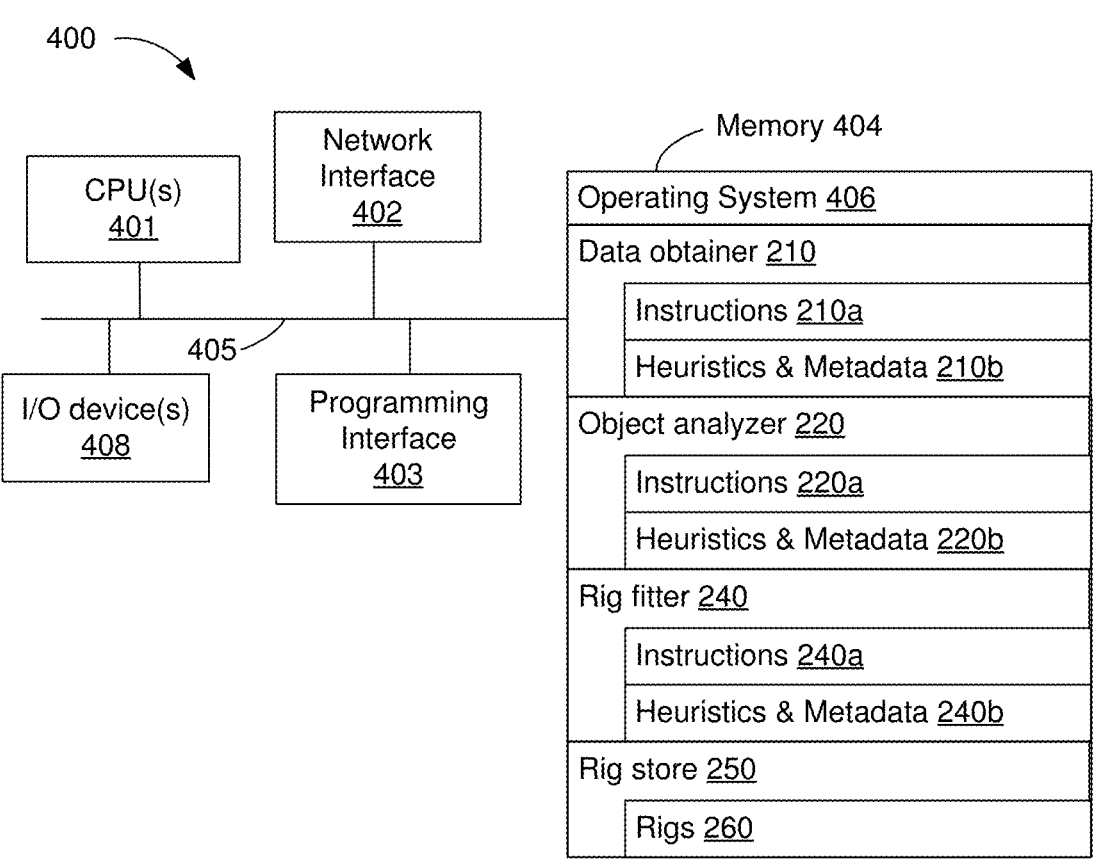
FIG. 4 is a block diagram of a device that associates a rig with an object in accordance with some implementations.

FIG. 4 is a block diagram of a device 400 in accordance with some implementations. In some implementations, the device 400 implements the object rigger 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O)

devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a receiver for receiving a request to apply a rig to an object (e.g., the request 24 shown in FIG. 1A and/or the request 212 shown in FIG. 2). In some implementations, the one or more I/O devices 408 include a transmitter for transmitting a rig for the object (e.g., the first rig 260*a* and the corresponding first motion controller 270*a* shown in FIG. 2). In some implementations, the receiver and the transceiver collectively form a transceiver.

In some implementations, the memory 404 or the non-transitory computer readable storage medium of the memory 404 stores the following programs, modules and data structures, or a subset thereof including an optional operating system 406, the data obtainer 210, the object analyzer 220, the rig fitter 240 and the rig store 250. In various implementations, the data obtainer 210 includes instructions 210*a*, and heuristics and metadata 210*b* for obtaining a request to rig an object (e.g., the request 24 shown in FIG. 1A and/or the request 212 shown in FIG. 2). In various implementations, the object analyzer 220 includes instructions 220*a*, and heuristics and metadata 220*b* for determining visual appearance values that characterize an appearance of the object (e.g., the visual appearance values 222 shown in FIG. 2). In various implementations, the rig fitter 240 includes instructions 240*a*, and heuristics and metadata 240*b* for selecting and associating one or more of the rigs 260 with the object based on the visual appearance values of the object. In various implementations, the device 400 performs the method 300 shown in FIG. 3.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including one or more processors, a display and a non-transitory memory:

determining a set of one or more visual appearance values that indicate a visual appearance of an object that is to be placed in an environment;

selecting, based on the set of one or more visual appearance values, a rig that allows the object to be manipulated to exhibit movement in the environment by:

populating a volumetric space of the object with voxels; and selecting the rig from a plurality of rigs based on an arrangement of the voxels within the volumetric space of the object;

applying the rig to the object by associating joints of the rig with respective portions of the object; and animating the object within the environment by manipulating the joints of the rig associated with the object.

2. The method of claim 1, wherein selecting the rig comprises selecting the rig in response to the arrangement of the voxels matching an arrangement of the joints in the rig.

3. The method of claim 1, wherein a number of voxels that occupy the volumetric space of the object is based on a resolution of the voxels; and wherein selecting the rig comprises:

selecting a first one of the plurality of rigs in response to the resolution of the voxels being a first resolution that results in a first number of voxels that is a threshold number; and selecting a second one of the plurality of rigs in response to the resolution of the voxels being a second resolution that results in a second number of voxels that is less than the threshold number.

4. The method of claim 1, wherein the rig is associated with a tool that allows the object to be manipulated in order to provide an appearance that the object is performing an action.

5. The method of claim 4, wherein the tool includes an animation clip for an animation that corresponds to the action.

6. The method of claim 4, wherein the action includes moving along a path and the tool includes a motion path clip that allows the object to move along the path.

7. The method of claim 1, wherein the rig is associated with a second object with a second set of one or more visual appearance values; and wherein selecting the rig comprises selecting the rig in response to the set of one or more visual appearance values being within a threshold of the second set of one or more visual appearance values.

8. The method of claim 1, wherein the object includes a string of characters, and wherein applying the rig to the object comprises associating different joints with respective characters in the string of characters.

9. The method of claim 1, wherein applying the rig comprises restricting movement of at least some of the joints based on the set of one or more visual appearance values.

10. The method of claim 1, wherein applying the rig comprises applying symmetric portions of the rig to symmetric portions of the object in different manners.

11. The method of claim 1, wherein applying the rig to the object comprises assigning respective weights to the joints based on the set of one or more visual appearance values.

12. The method of claim 1, wherein the rig comprises at least one of a single joint rig, a stack rig, a quadrupedal rig, or a bipedal rig.

13. A device comprising:

one or more processors;

a non-transitory memory; and one or more programs stored in the non-transitory memory, which, when executed by the one or more processors, cause the device to:

determine a set of one or more visual appearance values that indicate a visual appearance of an object that is to be placed in an environment;

select, based on the set of one or more visual appearance values, a rig that allows the object to be manipulated to exhibit movement in the environment;

apply the rig to the object by associating joints of the rig with respective portions of the object;

obtain a request to display an edit mode for changing the association of the joints with the portions of the object;

display the joints of the rig in association with the respective portions of the object, wherein a first one of the joints is associated with a first one of the portions of the object;

detect a user input that corresponds to moving the first one of the joints of the rig from the first one of the portions to a second one of the portions of the object;

associate the first one of the joints with the second one of the portions of the object; and animate the object within the environment by manipulating the joints of the rig associated with the object.

14. The device of claim 13, wherein the joints collectively form a tree data structure, and wherein the one or more programs further cause the device to:

obtaining a user input that associates a second one of the joints with a third one of the portions of the object, wherein the second one of the joints represents a root node in the tree data structure and a remainder of the joints represent child nodes that depend on the root node; and associating the remainder of the joints with a remainder of the portions of the object based on the association of the second one of the joints with the third one of the portions of the object.

15. The device of claim 14, wherein the one or more programs cause the device to obtain the user input by displaying a prompt to associate the first one of the joints with one of the portions of the object.

16. The device of claim 13, wherein the one or more programs cause the device to select the rig from a plurality of rigs.

17. A non-transitory memory storing one or more programs, which, when executed by one or more processors of a device, cause the device to:

determine a set of one or more visual appearance values that indicate a visual appearance of an object that is to be placed in an environment;

select, based on the set of one or more visual appearance values, a rig that allows the object to be manipulated to exhibit movement in the environment by:

selecting a first rig for a first portion of the object based on a first one of the set of one or more visual appearance values indicating that the first portion of the object has a first visual appearance that satisfies a first accommodation criterion associated with the first rig; and selecting a second rig for a second portion of the object based on a second one of the set of one or more visual appearance values indicating that the second portion of the object has a second visual appearance that satisfies a second accommodation criterion associated with the second rig;

apply the rig to the object by associating joints of the rig with respective portions of the object; and animate the object within the environment by manipulating the joints of the rig associated with the object.

18. The non-transitory memory of claim 17, wherein the one or more programs cause the device to synthesize the rig by combining the first rig and the second rig.

\* \* \* \* \*